(12) United States Patent
Astigarraga et al.

(10) Patent No.: US 8,055,867 B2
(45) Date of Patent: Nov. 8, 2011

(54) METHODS, APPARATUSES, AND COMPUTER PROGRAM PRODUCTS FOR PROTECTING PRE-STAGED PROVISIONED DATA IN A STORAGE SYSTEM

(75) Inventors: Tara Astigarraga, Vail, AZ (US); Michael E. Browne, Staatsburg, NY (US); Christina A. Lara, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 11/972,759

(22) Filed: Jan. 11, 2008

(65) Prior Publication Data

US 2009/0182961 A1     Jul. 16, 2009

(51) Int. Cl.
    *G06F 12/16* (2006.01)
(52) U.S. Cl. .................... 711/162; 711/E12.103
(58) Field of Classification Search .......... 711/162, 711/114, E12.103
    See application file for complete search history.

(56) References Cited

U.S. PATENT DOCUMENTS

| | | | |
|---|---|---|---|
| 6,687,254 B1 * | 2/2004 | Ho et al. ................ 370/412 |
| 6,968,434 B2 | 11/2005 | Kamano et al. |
| 6,985,983 B2 | 1/2006 | Pellegrino et al. |
| 7,107,328 B1 | 9/2006 | Muthiyan et al. |
| 7,137,124 B2 | 11/2006 | Lamb et al. |
| 7,155,593 B2 | 12/2006 | Kano |
| 7,350,043 B2 * | 3/2008 | Andre et al. ................ 711/162 |
| 7,694,089 B2 * | 4/2010 | Furuhashi et al. ........... 711/162 |
| 2003/0088658 A1 * | 5/2003 | Davies et al. ................ 709/223 |
| 2003/0182422 A1 | 9/2003 | Bradshaw et al. |
| 2005/0033914 A1 * | 2/2005 | Matsunami et al. .......... 711/114 |
| 2005/0114595 A1 | 5/2005 | Karr et al. |
| 2006/0047928 A1 | 3/2006 | Bhasin et al. |
| 2006/0230219 A1 | 10/2006 | Njoku et al. |
| 2006/0242352 A1 * | 10/2006 | Torudbakken et al. ....... 710/312 |
| 2006/0242354 A1 * | 10/2006 | Johnsen et al. .............. 710/316 |
| 2006/0253619 A1 * | 11/2006 | Torudbakken et al. ........ 710/31 |
| 2006/0265529 A1 | 11/2006 | Kuik et al. |
| 2010/0023718 A1 * | 1/2010 | Mosek ..................... 711/163 |

OTHER PUBLICATIONS

SANPoint Control V3.5 HW/SW Support Matrix, Veritas, Nov. 14, 2003, Copyright 2002, 11 pages.
Dakshi Agrawal, et al., Policy-Based Validation of SAN Configuration, Fifth IEEE International Workshop on Policies for Distributed Systems and Networks (Policy '04), 2004, 12 pages.

* cited by examiner

*Primary Examiner* — Mardochee Chery
(74) *Attorney, Agent, or Firm* — Cantor Colburn LLP; Steven Chiu

(57) ABSTRACT

A method can include identifying a storage area in the storage system for access control, assigning a switching criterion to modify allowable access to the identified storage area, where the identified storage area supports pre-staging of provisioned data, and blocking a select access attempt to the identified storage area as a function of the switching criterion.

18 Claims, 3 Drawing Sheets

METHODS, APPARATUSES, AND COMPUTER PROGRAM PRODUCTS FOR PROTECTING PRE-STAGED PROVISIONED DATA IN A STORAGE SYSTEM

BACKGROUND OF THE INVENTION

1. Field of the Invention

The present disclosure relates generally to storage system access management, and, in particular, to methods, apparatuses, and computer program products for protecting pre-staged provisioned data in a storage system.

2. Description of Background

A storage system may support multiple host servers with multiple host images per host server that are dynamically reconfigured over a period of time. The storage system can include multiple networks, such as one or more storage area networks (SANs) and/or local area networks (LANs) for accessing shared storage resources. For example, a pool of disks accessible via the storage system may include data for provisioning host images to execute operating systems such as: UNIX®, UNIX-like operating systems (e.g., Solaris®, Linux®, AIX®), Microsoft® Windows®, and IBM® z/OS®. The data associated with each host image may require some level of protection from access by the other host images. The host images can be part of a virtualized environment that supports allocation of resources in a virtualization layer across multiple physical devices. Such an environment allows common physical hardware to be reconfigured using logical partitions (LPARs) to switch between host images on a host server. The process of reconfiguration to support different host images is also referred to as provisioning. For example, an LPAR in a host server can be provisioned to execute a Linux® host image for a period of time to support one customer, and then be re-provisioned to execute an AIX® host image at a later period to support another customer.

When one or more host images have access to multiple sets of storage, which are then enabled to allow physical access below the virtualization layer, certain problems can exist. These problems can include security of data, where host images can view data allocated to other host images. Protection of the data itself can also be challenging, as host images may manipulate data belonging to other host images without any knowledge of the data owner. In these scenarios, the resulting security issues can be disruptive and harmful to businesses utilizing the storage system.

Currently, existing solutions to handle one or more host images accessing multiple sets of storage involves removing physical access below the virtualization layer by not providing world wide port names (WWPNs) to locate access control information on storage devices in the storage system. The storage devices can be accessed using logical unit numbers (LUNs) to define addresses of virtual partitions. When physical access is required to the LUNs, individual WWPNs are applied.

When a new host image is provisioned via virtualization there is a need for contemporaneous action coordinated between the storage devices and the host server provisioning control mechanism to apply the correct WWPNs to the LUNS. This is usually an error prone process and takes additional processing time, which delays the provisioning of the next host image and reduces utilization of the physical resources. It would be beneficial to develop an approach to support pre-staging of provisioned data in a storage system such that the provisioned data is ready on demand and protected from other host images while inactive. What is needed, therefore, is a way to protect pre-staged provisioned data in a storage system.

BRIEF SUMMARY OF THE INVENTION

Embodiments of the invention include a method for protecting pre-staged provisioned data in a storage system. The method includes identifying a storage area in the storage system for access control. The method also includes assigning a switching criterion to modify allowable access to the identified storage area, where the identified storage area supports pre-staging of provisioned data. The method further includes blocking a select access attempt to the identified storage area as a function of the switching criterion.

Additional embodiments include an apparatus for protecting pre-staged provisioned data in a storage system. The apparatus includes an access switch. The access switch controls access to an identified storage area in the storage system, where the identified storage area supports pre-staging of provisioned data. The access switch performs a method that includes receiving a switching criterion to modify allowable access to the identified storage area, and blocking a select access attempt to the identified storage area as a function of the switching criterion.

Further embodiments include a computer program product for protecting pre-staged provisioned data in a storage system. The computer program product includes a storage medium readable by a processing circuit and storing instructions for execution by the processing circuit for implementing a method. The method includes receiving a switching criterion to modify allowable access to an identified storage area, where the identified storage area supports pre-staging of provisioned data. The method further includes blocking a select access attempt to the identified storage area as a function of the switching criterion.

Other apparatuses, methods, and/or computer program products according to embodiments will be or become apparent to one with skill in the art upon review of the following drawings and detailed description. It is intended that all such additional apparatuses, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed herein are methods, apparatuses, and computer program products for protecting pre-staged provisioned data in a storage system supporting multiple host images. In exemplary embodiments, a storage system supports provisioning of multiple host images to one or more logical partitions (LPARs) in one or more host servers. Each LPAR can be provisioned to support a variety of operating systems, such as Solaris®, Linux®, AIX®, Microsoft® Windows®, and IBM® z/OS®. Moreover, provisioning can establish particular versions of each operating system, as well as associated applications and data for each LPAR. The host images are initially stored in storage devices that are partitioned using virtualization into multiple logical unit numbers (LUNs). A provisioning manager controls provisioning to configure the contents of the LUNs and LPAR mapping to the LUNs. A virtualized environment is employed to support grouping and distribution of physical resources for host image execution.

Exemplary embodiments provide an access enabling or disabling interface for host images on the LUNs, while still allowing authorized advanced storage controller features to operate on the LUNs. The access control may also be applied to a storage volume group including multiple LUNs. The access control allows for pre-configuration of environments in a data center, while protecting data access from unauthorized host images. Exemplary embodiments also provide for faster provisioning of images and fewer errors involved in the provisioning process as compared to prior art approaches that rely upon manual updates of world wide port names (WWPNs) for access control. WWPNs are typically 16 byte hexadecimal codes that present an opportunity for erroneous entry. As the number of LUNs and host images supported grows to a large scale (e.g., thousands), advantages associated with access control increase. Further details regarding access control for protecting pre-staged provisioned data are provided herein.

Figure 1:
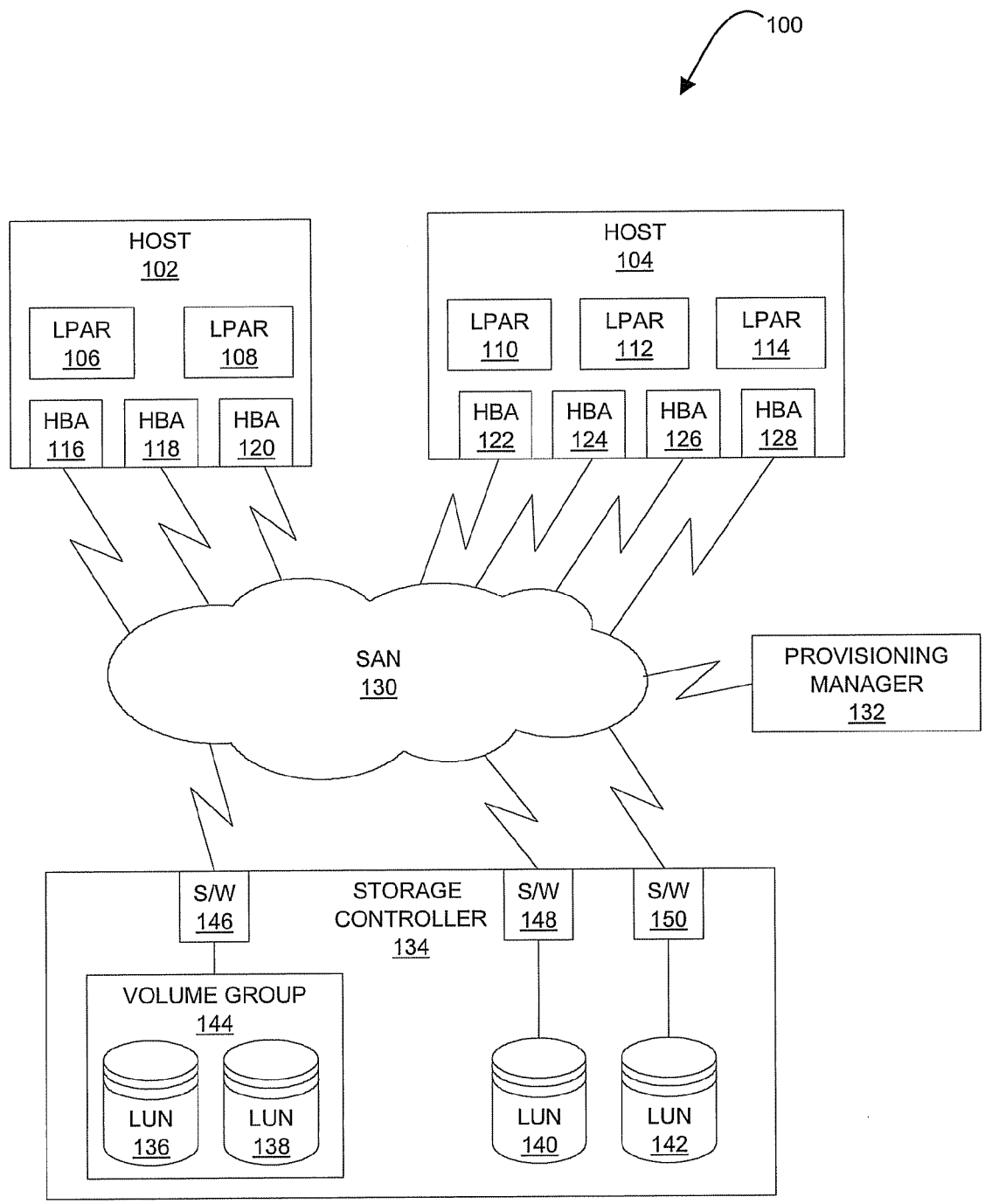
FIG. 1 depicts a storage system upon which protecting pre-staged provisioned data may be performed in exemplary embodiments.

Tuning now to FIG. 1, an exemplary storage system 100 upon which protecting pre-staged provisioned data can be performed will now be described in accordance with exemplary embodiments. The storage system 100 may be a data center supporting re-provisioning of host images and data prior to workload execution, as well as protecting pre-staged provisioned data. In exemplary embodiments, the storage system 100 includes host servers 102 and 104, which can contain a variable number of LPARs. For example, host server 102 includes LPARs 106 and 108, while host server 104 includes LPARs 110, 112, and 114. The LPARs 106-114 are re-configurable areas of memory that support independent instances of operating systems and applications. The host servers 102 and 104 also include host bus adapters (HBAs) 116, 118, 120, 122, 124, 126, and 128 to interface with other devices across storage area network (SAN) 130. The SAN 130 may include any number of switches, routers, hubs, computers, cables, and the like. The host servers 102 and 104 include other processing elements known in the art that are not depicted, e.g., processing circuits, power supplies, user interfaces, and the like. While only two host servers 102 and 104 with LPARs 106-114 and HBAs 116-128 are depicted in FIG. 1, it will be understood that any number of host servers, LPARs, and HBAs are included within the scope of the invention.

A provisioning manager 132 may also be coupled to the SAN 130. The provisioning manager 132 controls host image selection and assignment for the LPARs 106-114. In exemplary embodiments, the provisioning manager 132 communicates with a storage controller 134 to provision a host image for each LPAR 106-114. The provisioning manager 132 can request that the storage controller 134 provision host image environments, including data, as customer workloads for the LPARs 106-114. Both the provisioning manager 132 and the storage controller 134 include processing elements (not depicted), such as one or more processing circuits capable of reading and executing instructions from tangible storage media.

The storage controller 134 includes multiple storage devices, such as hard disk drives (HDDs), that are organized in virtual partitions. The virtual partitions can be addressed as LUNs 136, 138, 140, and 142. LUNs can also be grouped, such as LUNs 136 and 138 in storage volume group 144. In exemplary embodiments, the storage controller 134 includes access switches (S/W) 146, 148, and 150. The S/W 146 controls access to the storage volume group 144, while S/Ws 148 and 150 control access to LUNs 140 and 142 respectively. Any number of LUNs, storage volumes groups, S/Ws, and storage controllers are included within the scope of the invention.

The S/Ws 146-150 limit access to the storage volume group 144 and LUNs 140 and 142 such that host images executing in the LPARs 106-114 have criteria limited access. However, the storage controller 134 and the provisioning manager 132 can perform additional tasks (e.g., copying) to storage areas protected by the S/Ws 146-150 while access is disabled to the LPARs 106-114. Using a software-based implementation of the S/Ws 146-150 may enable characteristics of allowed and prohibited accesses to change depending upon the source of an access request, as well as the type of access requested. A variety of criteria can be used to control each of the S/Ws 146-150, such as a point in time, an event trigger, a performance metric, or other criteria. When the S/Ws 146-150 are in the "disabled" or "off" state, the LPARs 106-114 are blocked from accessing the underlying storage areas (i.e., storage volume group 144 and LUNs 140 and 142). When the S/Ws 146-150 are in the "enabled" or "on" state, select LPARs from the LPARs 106-114 can access the underlying storage areas. Each of the S/Ws 146-150 is individually configurable. For example, when S/W 148 is enabled, LPAR 108 may have exclusive access to the LUN 140, blocking all access attempts of the LUN 140 from host images running on LPARs 106 and 110-114.

Figure 2:
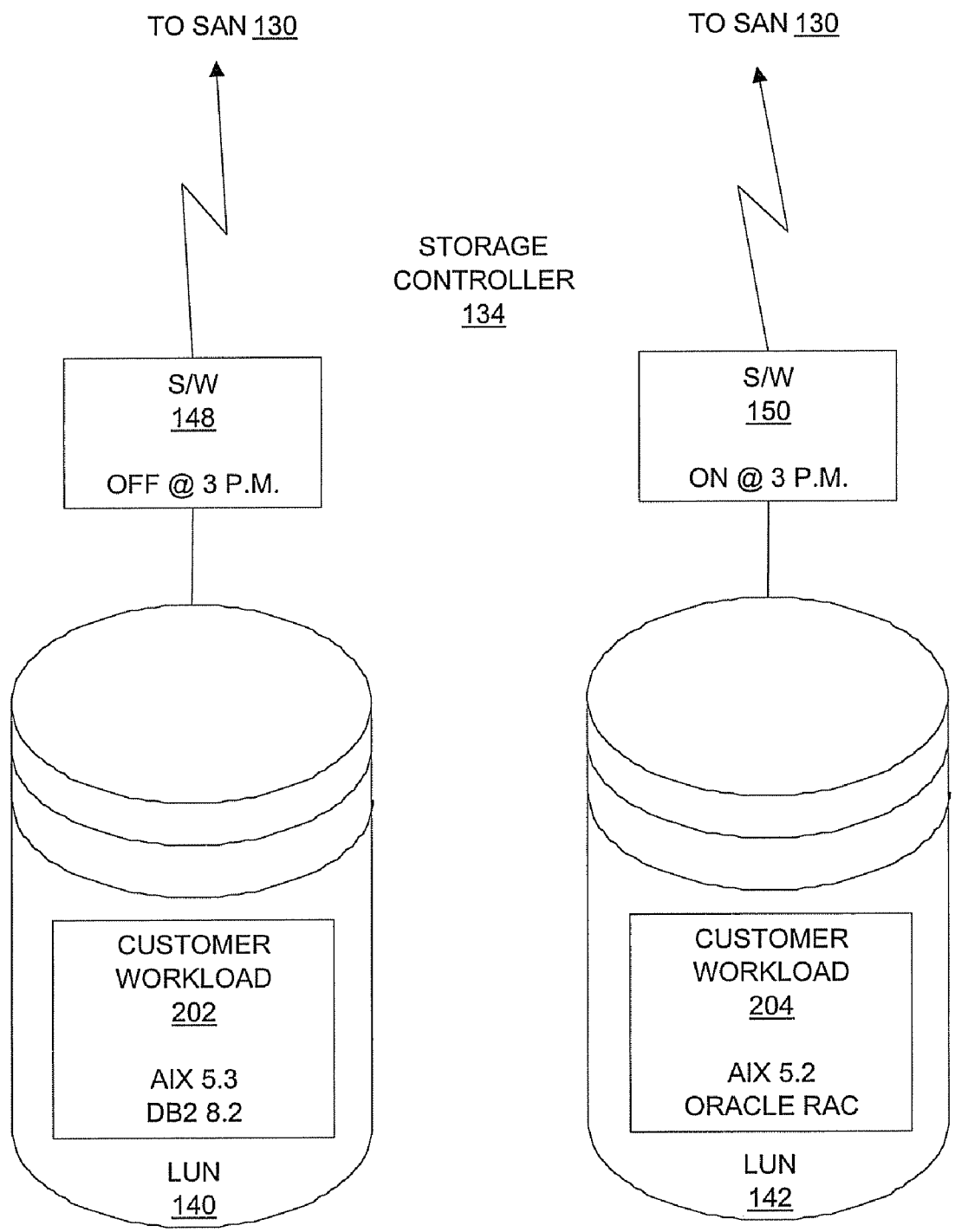
FIG. 2 depicts exemplary pre-staged provisioned data protected in accordance with exemplary embodiments.

In one example, as depicted in FIG. 2, multiple customer workloads in the storage controller 134 are defined for a common LPAR of the storage system 100 of FIG. 1. In this example, LPAR 110 of host server 104 of FIG. 1 is to be provisioned for two different customer workloads at known points in time. LUN 140 includes customer workload 202 and LUN 142 includes customer workload 204. The provisioning manager 132 of FIG. 1 pre-stages the customer workloads 202 and 204 by requesting that specific host image and application data are provisioned in LUNs 140 and 142. The customer workload 202 includes an operating system image (AIX® version 5.3) and a database (DB2® version 8.2). The customer workload 204 includes a different operating system image (AIX® version 5.2) and database (Oracle® Real Application Clusters (RAC)). The LPAR 110 can access the SAN 130 using any of the BBAs 122-128 of FIG. 1.

In the example depicted in FIG. 2, LUNs 140 and 142 have WWPNs of HBAs 122-128 of FIG. 1 defined, providing multiple potential access paths to the LUNs 140 and 142. The provisioning manager 132 of FIG. 1 can configure S/Ws 148 and 150 to modify access for LPAR 110 of FIG. 1 at different points in time. For example, LPAR 110 may initially have access to customer workload 202 on LUN 140, with S/W 148 configured to switch off at 3 P.M. and S/W 150 configured to switch on at 3 P.M. While S/W 150 is disabled, LPAR 110 cannot access or otherwise modify the customer workload 204 on LUN 142, and thus customer workload 204 is protected. Once switching occurs, the provisioning manager 132 can reconfigure the LPAR 110 to load and access the customer workload 204. While the S/W 148 is disabled, LPAR 110 cannot access or otherwise modify the customer workload 202 on LUN 140, which was previously accessible. Configuration information for the S/Ws 148 and 150 can be stored locally in the storage controller 134, defining accessibility rules and switching criteria for the underlying storage areas, i.e., LUNs 140 and 142 for the S/Ws 148 and 150. Although the example depicted in FIG. 2 uses point-in-time switching criteria, other switching criteria can also be employed in accordance with exemplary embodiments, e.g., event triggers, performance metrics, or other criteria.

The storage system 100 of FIG. 1 can also perform advanced storage features, for instance, point-in-time copying (e.g., flash copy) and peer-to-peer remote copying (PPRC) to LUNs 140 and 142, as well as storage volume group 144 while they are in the disabled access state. Point-in-time copying allows for internal transfers between LUNs and/or storage volume groups to occur while the associated S/Ws are disabled. PPRC allows for copying of data on LUNs and/or storage volume groups across a network, such as the SAN 130, while the associated S/Ws are disabled. This allows for better utilization of the available data access time, and provides a shorter setup time for provisioning of a new environment. For example, LUNs or storage volume groups can be pre-staged while LPAR access is blocked. Additional tasks, such as performing backup copying, encryption, compression, and error detection can be performed to protected storage areas while S/Ws protecting the storage areas are in the disabled state.

Figure 3:
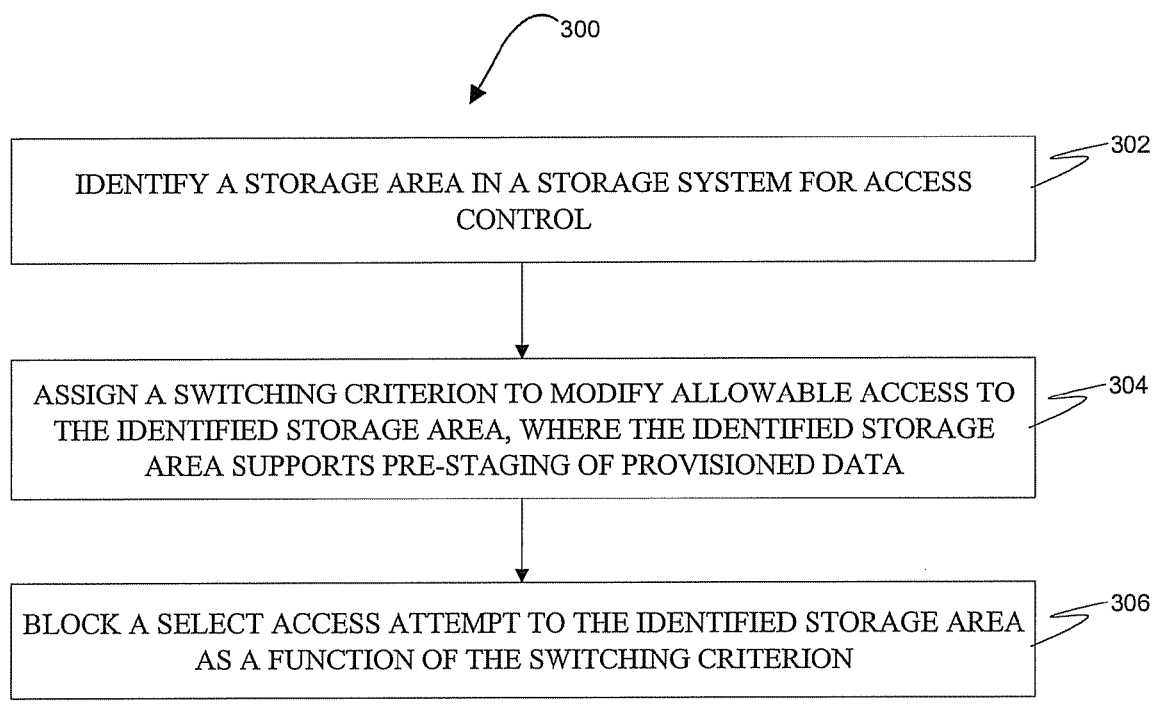
FIG. 3 depicts an exemplary process for protecting pre-staged provisioned data.

Turning now to FIG. 3, a process 300 for protecting pre-staged provisioned data in a storage system will now be described in reference to the storage system 100 of FIG. 1 and in accordance with exemplary embodiments. At block 302, the provisioning manager 132 identifies a storage area in the storage system 100 for access control. The storage area can be a LUN, such as LUNs 136-142, and/or storage volume group 144 in the storage controller 134. An administrator of the storage system 100 can also identify the storage area. Moreover, multiple storage areas in the storage controller 134 can be protected using access control switching.

At block 304, the provisioning manager 132 assigns a switching criterion to modify allowable access to the identified storage area. The switching criterion can be programmed into an access switch that controls access to the identified storage area, e.g., S/W 150 for LUN 142. The identified storage area supports pre-staging of provisioned data, allowing the provisioning manager 132 and/or storage controller 134 to modify the contents of the identified storage area while blocking access from the LPARS 106-114. The storage controller 134 receives switching criteria information and configures the S/Ws accordingly. A variety of switching criteria may be supported, such as a point in time, an event trigger, a performance metric, or other criteria.

At block 306, the storage controller 134 uses a S/W to block select access attempts to the identified storage area as a function of the associated switching criterion. For example, as depicted in FIG. 2, S/W 150 blocks a host image executing in LPAR 110 of FIG. 1 from accessing LUN 142 until 3 P.M., when S/W 150 switches from off (disabled) to on (enabled). LPARs (e.g., LPARs 106, 108, 112, and 114) that are not mapped to access LUNs 140 and 142 are blocked without respect to the switching criterion. Thus, LUNs 140 and 142 can be pre-staged with host image data while disabled, allowing for rapid provisioning of LPAR 110 as it is reconfigured between customer workloads 202 and 204. Without the access control provided by the S/Ws 148 and 150, LPAR 110 could potentially access or modify customer workload data that should not be accessible, e.g. access customer workload 202 while configured for customer workload 204.

Technical effects of exemplary embodiments include protecting pre-staged provisioned data in a storage system using access control switches in front of LUNs and/or storage volume groups. Advantages may include enabling and disabling access to storage areas while allowing authorized advanced storage controller features to operate on disabled storage areas. Further advantages include reduced provisioning time to pre-stage storage areas prior to enabling LPAR access.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for protecting pre-staged provisioned data in a storage system, the method comprising:
    identifying a storage area, having contents, in the storage system for access control;
    assigning a switching criterion to modify allowable access to the identified storage area, wherein the identified storage area supports pre-staging of provisioned data;
    blocking a select access attempt to the identified storage area as a function of the switching criterion, wherein the select access attempt is from a host image executing on a logical partition (LPAR) of a host server, wherein the contents in the identified storage area is modified, while the select access attempt is blocked; and blocking an additional access attempt from a second host image executing on a second LPAR, wherein the additional access attempt is blocked without respect to the switching criterion, wherein all accesses to the first and second host images are blocked.

2. The method of claim 1 wherein the switching criterion is software configurable and is one of: a point in time, an event trigger, and a performance metric.

3. The method of claim 1 wherein the identified storage area is one of: a logical unit number (LUN) and a storage volume group.

4. The method of claim 1 wherein the switching criterion modifies allowable access to disable blocking of the select access attempt or enable blocking of the select access attempt.

5. The method of claim 1 further comprising:
allowing performance of a storage management task on the identified storage area while blocking the select access attempt, wherein the storage management task includes one or more of: point-in-time copying, peer-to-peer remote copying, backup copying, encryption, compression, and error detection.

6. The method of claim 1 wherein the switching criterion is configured via a provisioning manager and controlled on a storage controller across a storage area network (SAN).

7. An apparatus for protecting pre-staged provisioned data in a storage system, the apparatus comprising:
an access switch, the access switch controlling access to an identified storage area having contents, in the storage system, wherein the identified storage area supports pre-staging of provisioned data, the access switch performing a method comprising:
receiving a switching criterion to modify allowable access to the identified storage area;
blocking a select access attempt to the identified storage area as a function of the switching criterion, wherein the select access attempt is from a host image executing on a logical partition (LPAR) of a host server, wherein the contents in the identified storage area is modified, while the select access attempt is blocked; and
blocking an additional access attempt from a second host image executing on a second LPAR, wherein the additional access attempt is blocked without respect to the switching criterion,
wherein all accesses to the first and second host images are blocked.

8. The apparatus of claim 7 wherein the switching criterion is software configurable and is one of: a point in time, an event trigger, and a performance metric.

9. The apparatus of claim 7 wherein the identified storage area is one of: a logical unit number (LUN) and a storage volume group.

10. The apparatus of claim 7 wherein the switching criterion modifies allowable access to disable blocking of the select access attempt or enable blocking of the select access attempt.

11. The apparatus of claim 7 wherein the access switch allows performance of a storage management task on the identified storage area while blocking the select access attempt, wherein the storage management task includes one or more of point-in-time copying, peer-to-peer remote copying, backup copying, encryption, compression, and error detection.

12. The apparatus of claim 7 wherein the switching criterion is configured via a provisioning manager and controlled on a storage controller across a storage area network (SAN).

13. A computer program product for protecting pre-staged provisioned data in a storage system, the computer program product comprising:
a storage medium readable by a processing circuit and storing instructions for execution by the processing circuit for implementing a method comprising:
receiving a switching criterion to modify allowable access to an identified storage area, having content, wherein the identified storage area supports pre-staging of provisioned data;
blocking a select access attempt to the identified storage area as a function of the switching criterion, wherein the select access attempt is from a host image executing on a logical partition (LPAR) of a host server, wherein the contents in the identified storage area is modified, while the select access attempt is blocked; and
blocking an additional access attempt from a second host image executing on a second LPAR, wherein the additional access attempt is blocked without respect to the switching criterion,
wherein all accesses to the first and second host images are blocked.

14. The computer program product of claim 13 wherein the switching criterion is software configurable and is one of: a point in time, an event trigger, and a performance metric.

15. The computer program product of claim 13 wherein the identified storage area is one of: a logical unit number (LUN) and a storage volume group.

16. The computer program product of claim 13 wherein the switching criterion modifies allowable access to disable blocking of the select access attempt or enable blocking of the select access attempt.

17. The computer program product of claim 13 further comprising:
allowing performance of a storage management task on the identified storage area while blocking the select access attempt, wherein the storage management task includes one or more of: point-in-time copying, peer-to-peer remote copying, backup copying, encryption, compression, and error detection.

18. The computer program product of claim 13 wherein the switching criterion is configured via a provisioning manager and controlled on a storage controller across a storage area network (SAN).

* * * * *